(12) United States Patent
Kanayama

(10) Patent No.: US 9,160,409 B2
(45) Date of Patent: Oct. 13, 2015

(54) COMMUNICATION APPARATUS

(75) Inventor: Mitsuhiro Kanayama, Takahama (JP)

(73) Assignee: DENSO CORPORATION, Kariya (JP)

( * ) Notice: Subject to any disclaimer, the term of this patent is extended or adjusted under 35 U.S.C. 154(b) by 805 days.

(21) Appl. No.: 13/355,755

(22) Filed: Jan. 23, 2012

(65) Prior Publication Data

US 2012/0187905 A1 Jul. 26, 2012

(30) Foreign Application Priority Data

Jan. 25, 2011 (JP) .................................... 2011-13212
Aug. 2, 2011 (JP) ................................. 2011-169502

(51) Int. Cl.
*H02J 7/00* (2006.01)
*H02J 7/14* (2006.01)
*H04B 3/54* (2006.01)
*B60L 11/18* (2006.01)
*H02J 7/02* (2006.01)

(52) U.S. Cl.
CPC ................ *H04B 3/54* (2013.01); *B60L 11/182* (2013.01); *H02J 7/025* (2013.01); *H04B 3/548* (2013.01); *B60L 11/1816* (2013.01); *B60L 11/1822* (2013.01); *H02J 7/0004* (2013.01); *H02J 7/0027* (2013.01); *H02J 2007/0096* (2013.01); *H04B 2203/547* (2013.01)

(58) Field of Classification Search
USPC ......... 320/109, 107, 104, 108, 134, 119, 132, 320/106, 110, 112, 137, 138, 145, 150, 162, 320/163, 164; 307/1, 10.1
See application file for complete search history.

(56) References Cited

U.S. PATENT DOCUMENTS

| | | | | |
|---|---|---|---|---|
| 5,272,431 A * | 12/1993 | Nee | ................................ | 320/109 |
| 5,596,258 A * | 1/1997 | Kimura et al. | ................ | 320/163 |
| 8,335,062 B2 * | 12/2012 | Haines et al. | .................... | 361/42 |
| 2009/0123814 A1 * | 5/2009 | Cabot et al. | ...................... | 429/50 |
| 2010/0121511 A1 * | 5/2010 | Onnerud et al. | ................ | 701/22 |
| 2010/0131137 A1 * | 5/2010 | Iida | ................................. | 701/22 |
| 2010/0299008 A1 * | 11/2010 | Mitsutani | ......................... | 701/22 |
| 2010/0327878 A1 * | 12/2010 | Ishikawa et al. | .............. | 324/537 |

(Continued)

FOREIGN PATENT DOCUMENTS

| | | |
|---|---|---|
| JP | 6-245325 | 9/1994 |
| JP | 9-167984 | 6/1997 |

(Continued)

OTHER PUBLICATIONS

Office Action (2 pages) dated Mar. 26, 2013, issued in corresponding Japanese Application No. 2011-169502 and English translation (2 pages).

*Primary Examiner* — Edward Tso
*Assistant Examiner* — Alexis A Boateng
(74) *Attorney, Agent, or Firm* — Nixon & Vanderhye P.C.

(57) ABSTRACT

A charging system supplies charging power from a charging station to an in-vehicle system through a power line. The charging station and the in-vehicle system further include communication devices, which communicate through the power line. The in-vehicle system includes a detecting circuit for detecting impedance of the power line. The in-vehicle system includes a control circuit, which controls switching-over of the communication device between a waiting state and an operating state based on the impedance detected by the detecting circuit. For example, the control circuit detects connection of the cable based on the impedance change of the power line. The control circuit switches the communication device from the waiting state to the operating state in response to the connection of the cable.

18 Claims, 10 Drawing Sheets

(56) References Cited

U.S. PATENT DOCUMENTS

| | | | |
|---|---|---|---|
| 2011/0000726 A1* | 1/2011 | Tanaka | 180/65.265 |
| 2011/0106329 A1* | 5/2011 | Donnelly et al. | 700/291 |
| 2011/0156640 A1* | 6/2011 | Moshfeghi | 320/108 |
| 2011/0202418 A1* | 8/2011 | Kempton et al. | 705/26.1 |
| 2012/0126747 A1* | 5/2012 | Kiko et al. | 320/109 |
| 2012/0313562 A1* | 12/2012 | Murao et al. | 318/139 |

FOREIGN PATENT DOCUMENTS

| | | |
|---|---|---|
| JP | 2002-345056 | 11/2002 |
| JP | 2009-033265 | 2/2009 |
| JP | 2009-42822 | 2/2009 |
| JP | 2009-278160 | 11/2009 |
| JP | 2010-11341 | 1/2010 |
| JP | 2010-234925 | 10/2010 |

\* cited by examiner

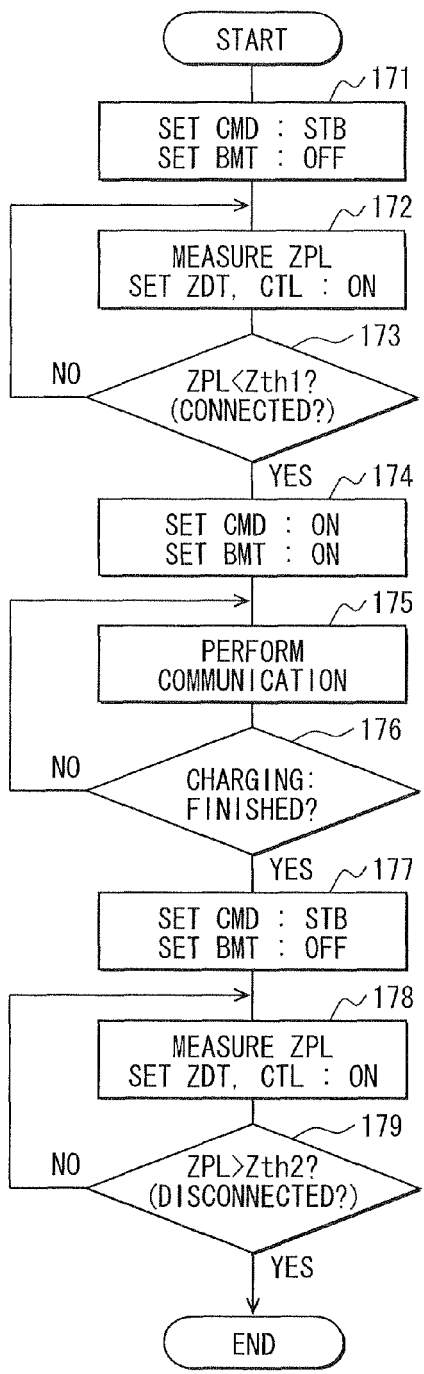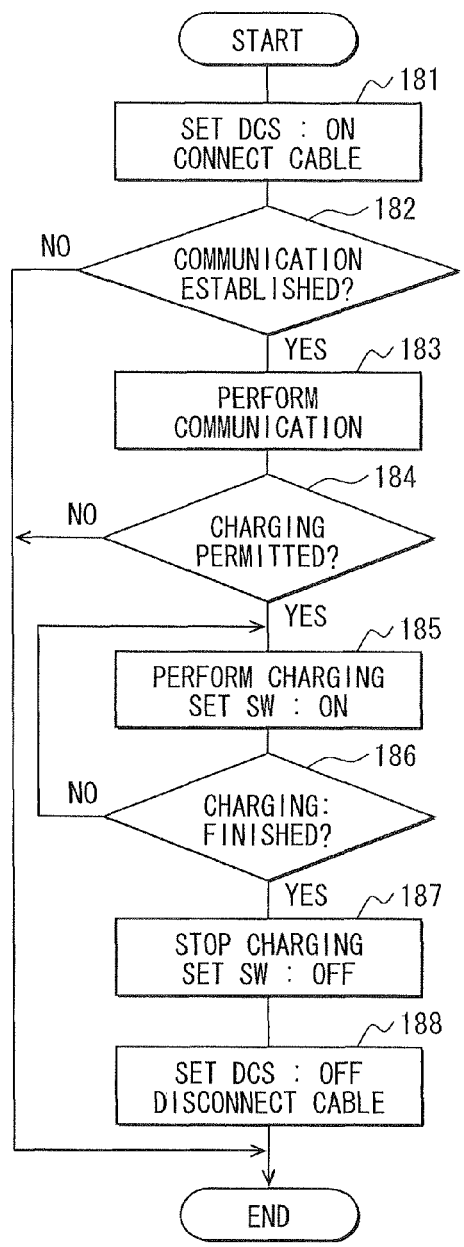

COMMUNICATION APPARATUS

CROSS REFERENCE TO RELATED APPLICATION

This application is based on and incorporates herein by reference Japanese patent applications No. 2011-13212 filed on Jan. 25, 2011 and No. 2011-169502 filed on Aug. 2, 2011.

TECHNICAL FIELD

The present invention relates to a communication apparatus, which performs communication through a cable connecting a power supply device and a load device.

BACKGROUND ART

JP 2009-42822A discloses a power line communication apparatus. According to this conventional power line communication apparatus, certification information is communicated between a power supply device and a load device to certify that the power supply device and the load device are in a predetermined normal combination. It is proposed to provide a switch in a plug receptacle and a power plug to output a signal when the power plug is plugged into the plug receptacle and perform power line communication in response to this signal.

According to the conventional device, a special switch need be formed in the plug receptacle and the power plug. It is therefore not possible to use a general-purpose plug or plural types of plugs. The special switch increases costs of a system. It is likely that the switch in a mechanical construction is likely to operate erroneously because of foreign matters for example. It is therefore difficult to realize high reliability.

Although it is possible to detect a connection of a power line by using a communication function of a power line communication apparatus, it is necessary to supply electric power to the power line communication apparatus even when the power line is not connected. This will result in increase of power consumption.

SUMMARY OF THE INVENTION

The present invention has an object to provide a communication apparatus, which suppresses power consumption.

The present invention has another object to provide a communication apparatus, which performs an activation operation from a waiting state to an operation state with high reliability.

The present invention has a further object to provide a communication apparatus, which detects connection of a cable without using a mechanical switch and performs an activation operation from a waiting state to an operation state in response to connection of the cable.

According to one aspect, a communication apparatus is provided for communication between a power supply device and a load device through an electric line including a power line, which is provided detachably between the power supply device and the load device to supply power from the power supply device to the load device. The communication apparatus comprises a communication device, an impedance detecting circuit and a control circuit. The communication device transmits and receives a communication signal through the electric line. The impedance detecting circuit detects impedance of the electric line. The control circuit switches over the communication device between a waiting state and an operating state based on the impedance detected by the detecting circuit.

BRIEF DESCRIPTION OF THE DRAWINGS

The above and other objects, features and advantages of the present invention will become more apparent from the following detailed description made with reference to the accompanying drawings. In the drawings:

FIG. 3 is a flowchart showing an operation of the in-vehicle system in the first embodiment;

FIG. 4 is a flowchart showing an operation of a charging station device in the first embodiment;

DETAILED DESCRIPTION OF THE EMBODIMENT

Figure 1:
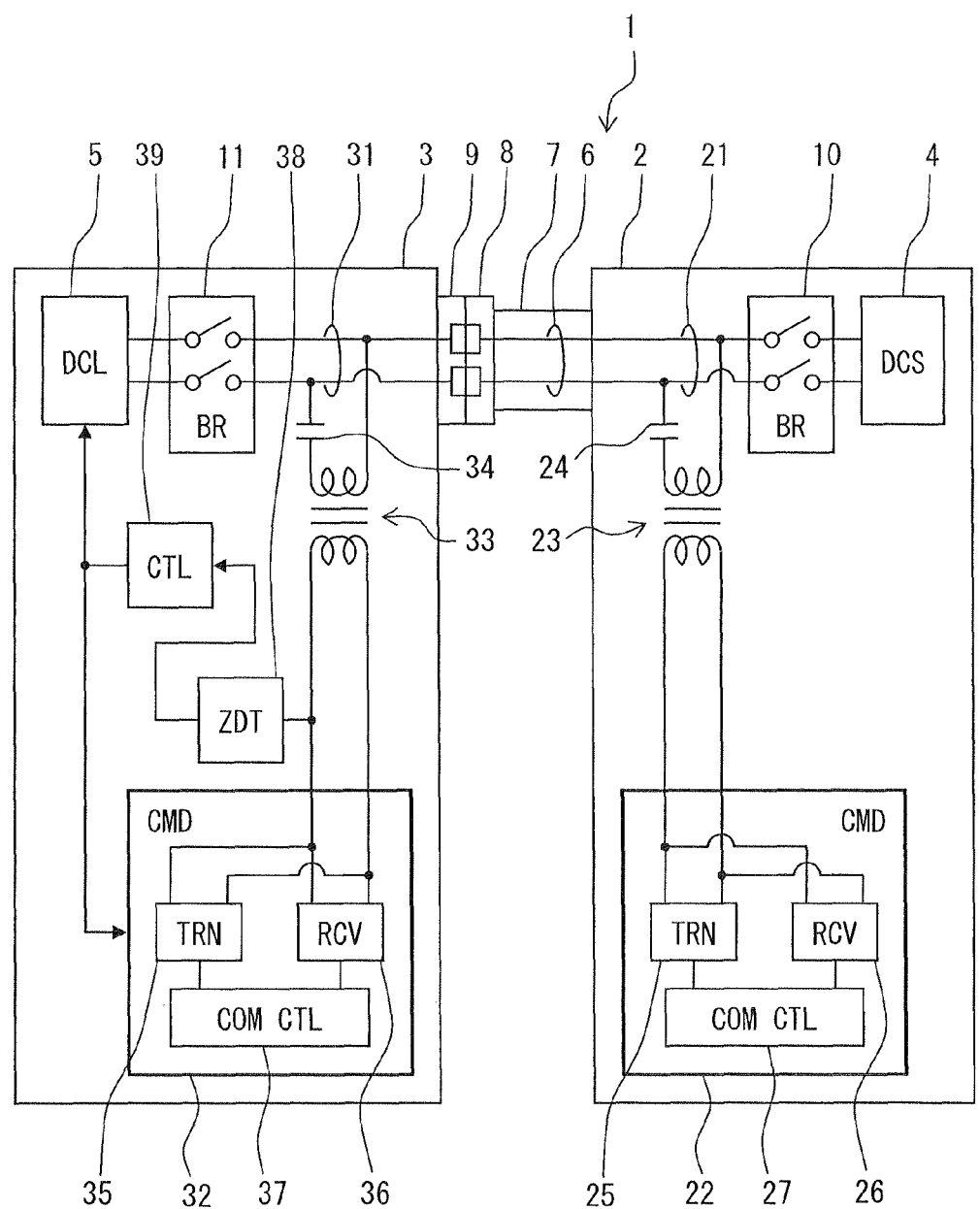
FIG. 1 is a block diagram showing a charging system according to a first embodiment, in which the present invention is implemented.

The present invention will be described below with reference to plural embodiments shown in the drawings, in which the same or similar parts are designated by the same or similar reference numerals for simplification of description.

First Embodiment

Referring to FIG. 1 showing a charging apparatus 1 according to a first embodiment, the charging system 1 includes a charging station 2 as a power supply device and an in-vehicle system 3 such as a battery system as a load device. The charging system 1 is also an electric power supply system, which supplies electric power from the charging station 2 to the in-vehicle system 3. The charging system 1 charges a battery of the in-vehicle system 3 from the charging station 2. The charging station 2 is installed at a private home or a commercial charging station. The charging station 2 is provided with a direct current power supply source (DCS) 4. The in-vehicle system 3 is mounted in an electric vehicle or a hybrid vehicle. The in-vehicle system 3 is provided with a direct current load (DCL) 5.

Electric power is supplied from the charging station 2 to the in-vehicle system 3 through a power line 6. The power line 6 is an electric line, which is a cable set and connects the charging station 2 and the in-vehicle system 3. Although the power line 6 is the cable set for supplying power to the in-vehicle system 3, it is capable of functioning as a signal line, which transmits signals in bilateral directions. A part of the power line 6 is built in a cable (CBL) 7, which is provided detachably between the charging station 2 and the in-vehicle system 3, and passes an inside part of the cable 7.

The cable 7 extends from the charging station 2 and manually manipulatable. The cable 7 is referred to as a charging cable 7 as well. The cable 7 is a connecting member, which connects one or plural electric lines between the charging station 2 and the in-vehicle system 3. The cable 7 is configured detachably to selectively provide one state, in which the charging station 2 and the in-vehicle system 3 are connected or disconnected. The cable 7 may house therein plural electric lines including the power line 6.

A coupler 8 is provided at a top end of the cable 7 as a part of the charging station side. A coupler 9 is provided at the in-vehicle system 3 as a part of the in-vehicle system side. The coupler 8 and the coupler 9 are detachable by manual operation. An operator puts the cable 7 in the connected state by manipulating the coupler 8 at the time of charging the in-vehicle system 3. Thus, the power line 6 is put in the connected state. The operator detaches the cable 7 by manipulating the coupler 8 at the time of finishing charging. Thus the power line 6 is put in the disconnected state. The power line 6 includes a first part 21 and a second part 31, which belong to the charging station 2 and the in-vehicle system 3, respectively. The cable 7, the coupler 8 and the coupler 9 form a connecting member, which connects the first part 21 and the second part 31.

The charging station 2 includes a breaker switch (BR) 10, which electrically connects and disconnects the DC power source 4 and the first part 21. The in-vehicle system 3 includes a breaker switch (BR) 11, which electrically connects and disconnects the DC load 5 and the second part 31.

The charging system 1 includes a communication apparatus, which provides communication between the charging station 2 and the in-vehicle system 3. The communication apparatus is a power line communication apparatus, which provides communication between the charging station 2 and the in-vehicle system 3 through the power line 6. The power line communication apparatus includes a communication device (CMD) 22, which is provided in the charging station 2 to transmit and receive communication signals relative to the power line 6. The power line communication apparatus also includes a communication device (CMD) 32, which is provided in the in-vehicle system 3 to transmit and receive communication signals relative to the power line 6. An insulating transformer 23 and a coupling capacitor 24 are provided between the communication device 22 and the first part 21 of the power line 6. An insulating transformer 33 and a coupling capacitor 34 are provided between the communication device 32 and the second part 31 of the power line 6. Thus the communication signals in high frequency pass from the communication devices 22, 32 to the power line 6 or from the power line 6 to the communication devices 22, 32.

The communication device 22 includes a transmitting circuit (TRN) 25, which transmits communication signals to the power line 6, a receiving circuit (RCV) 26, which receives communication signals from the power line 6, and a communication control circuit (COM CTL) 27, which controls the transmitting circuit 25 and the receiving circuit 26. The communication control circuit 27 includes a certification control section, which checks whether charging is permitted. The certification processing is performed based on an identification signal acquired by communication through the power line 6. The communication control circuit 27 turns on the breaker switch 10 (ON state) to permit the DC power source 4 to supply charging current to the power line 6 upon permission of charging. The communication control circuit 27 turns off the breaker switch 10 (OFF state) to inhibit the DC power source 4 from supplying the charging current upon inhibition of charging. The communication control circuit 27 is capable of controlling the DC power source 4 in accordance with a charging amount and a charging speed required by the in-vehicle system 3.

The communication device 32 includes a transmitting circuit (TRN) 35, which transmits communication signals to the power line 6, a receiving circuit (RCV) 36, which receives communication signals from the power line 6, and a communication control circuit (COM CTL) 37, which controls the transmitting circuit 35 and the receiving circuit 36. The communication control circuit 37 performs a part of predetermined certification processing. For example, the communication control circuit 37 transmits identification information required for the certification processing from the transmitting circuit 35 to the charging station 2 through the power line 6. The communication control circuit 37 further transmits charging information such as a charging amount and a charging speed required by the DC load 5 from the transmitting circuit 35 to the charging station 2 through the power line 6.

The in-vehicle system 3 includes a power supply control device, which controls power consumption of an electric component mounted in the in-vehicle system 3. The power supply control device controls the power consumption by limiting functions of the electric component. The functions of the electric component may be limited by regulating power supply to the electric component or halting a part of internal functions of the electric component. The power supply control device switches the electric component over to a limited state, in which its functions are limited, or a released state, in which the function limitation in the limited state is at least partly released. The power control section performs at least a switchover from the limited state to the released state. This switchover operation is an activation operation.

The limited state, in which the function of the electric component is limited, is a waiting state (standby state) or a halt state (sleep state). The limited state is a low power consumption state, in which power consumption is reduced and low. The released state, in which the function of the electric component is limited less, is an operating state or a normal state. The released state may be a state, in which all the functions of the electric component are permitted. The released state is a high power consumption state, in which power consumption is high.

According to the present embodiment, the power supply control device controls at least power consumption of the communication device 32. In one example, the power supply control device fully limits the functions of the communication device 32 by interrupting power supply to the communication device 32. In addition, the power supply control device fully releases the communication device 32 from the function limitation by permitting power supply to the communication device 32. In another example, the power supply control device limits only a part of the functions of the circuit by interrupting power supply to a part of the circuit. The power supply control device fully releases the communication device 32 from the function limitation by permitting power supply to all parts of the communication device 32.

The power supply control device includes an impedance detecting circuit (ZDT) 38 and a control circuit (CTL) 39. The detecting circuit 38 detects impedance Z of the power line 6. The control circuit 39 switches over the communication device 32 between the waiting state and the operating state in accordance with the impedance detected by the detecting circuit 38. The control circuit 39 switches over the communication device 32 from the waiting state to the operating state when the impedance detected by the detecting circuit 38 indicates manipulation of connecting the cable 7 to the in-vehicle system 3.

The control circuit 39 further switches over the DC load 5 between the waiting state and the operating state in accordance with the impedance detected by the detecting circuit 38. The control circuit 39 switches over the DC load 5 from the waiting state to the operating state when the impedance detected by the detecting circuit 38 indicates manipulation on the cable 7. According to this configuration, when the cable 7 is connected, the electric component including the DC load 5 and the communication device 32 is switched over from the waiting state to the operating state.

Figure 2:
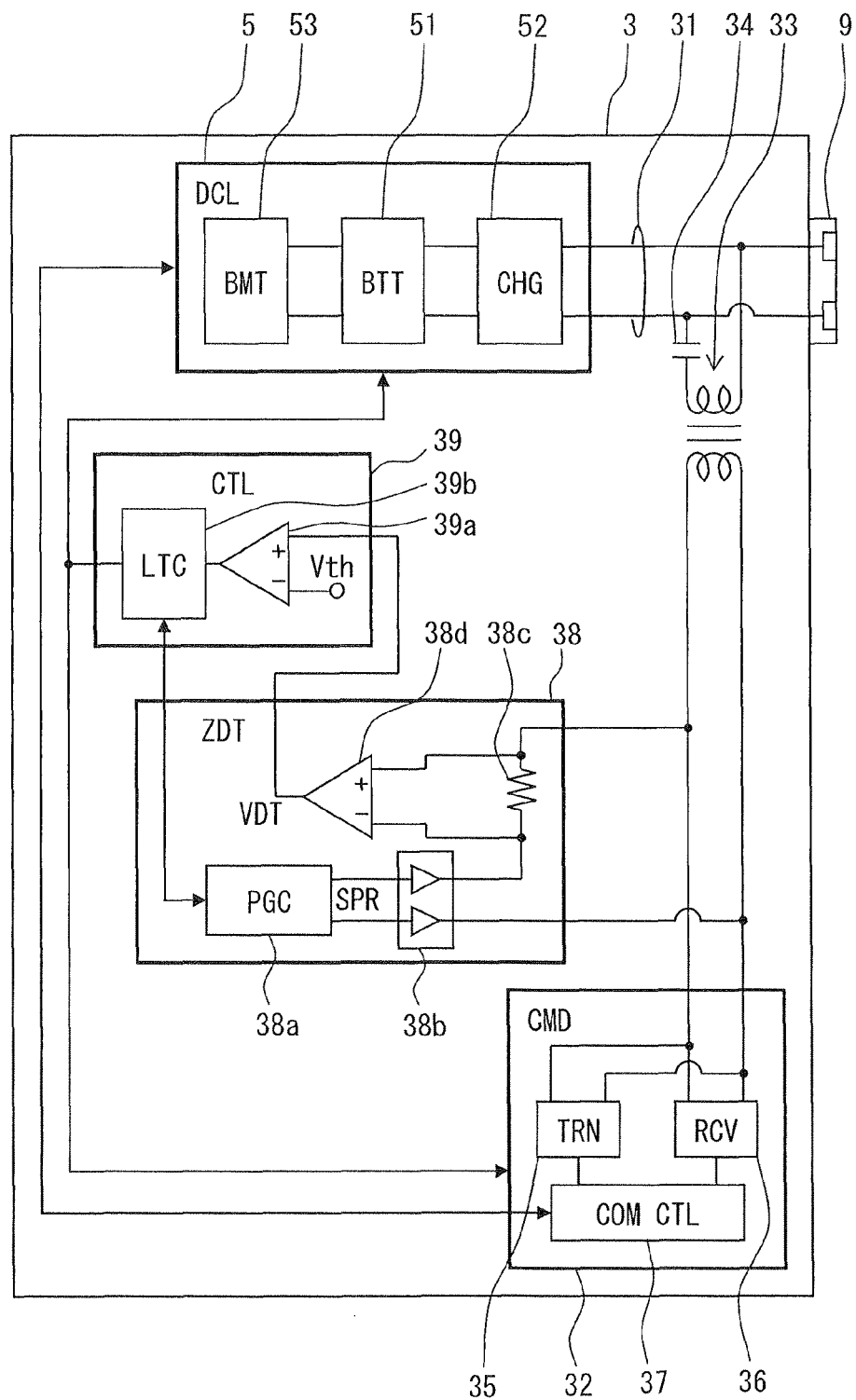
FIG. 2 is a block diagram showing an in-vehicle system in the first embodiment.

The in-vehicle system 3 is shown in detail in FIG. 2. The DC load 5 includes a battery (BTT) 51 mounted in a vehicle as a power supply source of the vehicle. The battery 51 is a comparatively large secondary battery, which supplies power to an electric motor for driving the vehicle. The DC load 5 includes a charging circuit (CHG) 52, which charges the battery 51 with power supplied from the power line 6, and a battery monitoring circuit (BMT) 53, which monitors a state of the battery 51 including a charge amount of the battery 51. The in-vehicle system 3 thus includes a secondary battery, which is charged by the charging station 2 through the power line 6. The charging station 2 is thus a charging device, which charges the battery 51.

The detecting circuit 38 includes a pulse generating circuit (PGC) 38a, which generates an inspection signal and supplies it to the power line 6. The detecting circuit 38 further includes an amplifier 38b, which amplifies the inspection signal. An output of the amplifier 38b is connected to a primary coil of an insulating transformer 33. The inspection signal amplified by the amplifier 38b is applied to the primary coil of the insulating transformer 33. A shunt resistor 38c is provided in a circuit between the amplifier 38b and the primary coil of the insulating transformer 33 for detecting current. The shunt resistor 38c generates a voltage drop corresponding to the current flowing in response to the inspection signal. The detecting circuit 38 includes a differential amplifier 38d, which amplifies a potential difference of the shunt resistor 38c. An output of the differential amplifier 38d is a voltage (VDT), which corresponds to the current flowing in response to the inspection signal. This voltage corresponds to the impedance of the power line 6 (second part 31), taken from the primary coil side of the insulating transformer 33.

When the cable 7 is being disconnected, the impedance of the power line 6 (second part 31) is high. Therefore, the current flowing in response to the inspection signal is small. When the cable 7 is being connected, the impedance of the power line 6 is low. When the inspection signal is applied under this state, current flows. This current is larger than that flowing when the cable 7 is disconnected. Thus, different currents flow depending on whether the cable 7 is in the connected state or the disconnected state. As a result, different voltages are produced at the output of the differential amplifier 38d depending on whether the cable 7 is in the connected state or in the disconnected state.

The detecting circuit 38 detects the impedance of the power line 6 as the voltage produced by the shunt resistor 38c in accordance with the output current of the amplifier 38b, which is detected when the inspection signal is outputted. That is, the detecting circuit 38 detects the impedance of the power line 6 by the current in an output circuit, which supplies the inspection signal to the power line 6, without directly detecting the current in the power line 6. The detecting circuit 38 thus detects the impedance of the power line 6 in accordance with the inspection signal.

According to this configuration, the impedance of the power line 6 can be detected by supplying the predetermined inspection signal to the power line 6. The inspection signal is a periodic pulse signal, which is outputted intermittently at a predetermined interval. The detecting circuit 38 thus detects the impedance of the power line 6 intermittently. Thus power consumption required for impedance detection can be lowered.

The control circuit 39 includes a comparator 39a, which compares a detection voltage produced from the detecting circuit 38 and a predetermined threshold value Vth. The comparator 39a forms checking section, which checks whether the impedance detected by the detecting circuit 38 is greater than a predetermined threshold value or is less than the predetermined threshold value. That is, the comparator 39a forms a checking section, which checks whether the impedance detected by the detecting circuit 38 indicates the disconnection of the cable 7 or the connection of the cable 7. The threshold value Vth may be a fixed value or a variable value, which provides a hysteresis characteristic in the checking operation. The control circuit 39 includes a latch circuit (LTC) 39a, which outputs a control signal in correspondence to an output of the comparator 39a. The latch circuit 39b latches the output state of the comparator 39a in timed relation with the inspection signal supplied from the pulse generating circuit 38a and outputs the latched output state as the control signal. The control signal produced from the latch circuit 39b causes a trigger signal, which starts wakeup processing for switching over the DC load 5 and the communication device 32 from the waiting state to the operating state.

The detecting circuit 38 and the control circuit 39 are configured by circuits, which consume less power than the communication device 32. The power consumed by the detecting circuit 38 and the control circuit 39 is much lower than that consumed when the communication device 32 is operating.

The in-vehicle system 3 operates by performing power supply control processing shown in FIG. 3. This power supply control processing is performed to suppress power consumption by limiting the functions of the communication device 32 and the functions of the battery monitoring circuit 53. Steps 171 to 174 and steps 177 to 179 indicate functions performed by the detecting circuit 38 and the control circuit 39. Steps 175 and 176 indicate are functions performed by the communication device 32.

When a power supply switch (not shown) in a vehicle is manipulated from an ON position to an OFF position, the in-vehicle system 3 switches over the power supply control mode from the normal mode to the standby mode to reduce power consumption. At step 171, the communication device 32 is set to the standby state (STB) and the battery monitoring circuit 53 is set to the stop state (OFF). Under this state, the cable-connecting manipulation on the cable 7 is detected by the detecting circuit 38 and the control circuit 39. When the vehicle is in use without being charged, the detecting circuit 38 and the control circuit 39 monitor and measure the impedance of the power line 6. At step 172, the impedance ZPL of the power line 6 is measured by the detecting circuit 38. Here, only the detecting circuit 38 and the control circuit 39 are in the operating state (ON). At step 173, it is checked by the control circuit 39 whether the detected impedance ZPL became less than the threshold value Zth1, which indicates a change from the disconnected state to the connected state of the cable 7. Steps 172 and 173 are repeated until the cable 7 is connected. The control circuit 39 thus forms a first checking section, which checks whether a change in the impedance ZPL detected by the detecting circuit 38 indicates the change from the disconnected state to the connected state of the cable 7. During the wait period provided by step 173, the power supply control mode in the in-vehicle system 3 is in a first standby mode. In this first standby mode, a decrease in impedance is detected. When the cable 7 is connected, step 174 is executed.

At step 174, by the control circuit 39, the communication device 32 is set to the operating state (ON) and the battery monitoring circuit 53 is set to the operating state (ON). That is, the in-vehicle system 3 returns the power supply control mode of devices related to charging of the battery 51 from the standby mode to the normal mode. The control circuit 39 thus forms an activation section, which switches over the communication device 32 from the waiting state to the operating state in response to the first checking section.

At step 175, predetermined communication processing is performed by the communication device 32. At step 176, it is checked whether the charging process including the communication processing has been finished. Steps 175 and 176 are repeated until the charging process is finished. When the charging processing is finished, step 177 is performed.

At step 177, the communication device 32 is set to the waiting state (standby state STB) and the battery monitoring circuit 53 is set to the stop state (OFF) by the communication control circuit 37, not by the control circuit 39. At steps 178 and 179, a cable separation manipulation (cable disconnection manipulation) of the cable 7 is detected by the detecting circuit 38 and the control circuit 39. At step 178, the impedance ZPL of the power line 6 is measured by the detecting circuit 38. Here, only the detecting circuit 38 and the control circuit 39 are in the operating state (ON). At step 179, it is checked by the control circuit 39 whether the detected impedance ZPL became a threshold value Zth2, which indicates a change from the connected state to the disconnected state of the cable 7. Steps 178 and 179 are repeated until the cable 7 is disconnected. The control circuit 39 thus forms a second checking section, which checks whether a change in the impedance ZPL detected by the detecting circuit 38 indicates the change from the connected state to the disconnected state of the cable 7. During the wait period provided by step 179, the power supply control mode in the in-vehicle system 3 is in a second standby mode. In the second standby mode, increase in the impedance is detected. When the cable 7 is disconnected, step 171 is executed. The control circuit 39 thus forms a return section, which returns to the check operation of the first checking section again in response to the second checking section.

Following step 179, the in-vehicle system 3 repeats the processing from step 171 again. That is, step 179 is followed by step 171. That is, after the cable-disconnecting manipulation on the cable 7 is detected, the cable-connecting manipulation on the cable 7 is waited. The second checking section starts its checking operation after the first checking section has determined the cable-connecting manipulation. Further, the first checking section starts its checking operation after the second checking section has determined the cable-disconnecting manipulation.

According to this configuration, the change of the cable 7 from the disconnected state to the connected state, that is, the cable-connecting manipulation, can be detected based on the change in the impedance. Thus, the communication device 32 can be activated after the cable-connecting manipulation. The change of the cable 7 from the connected state to the disconnected state, that is, the cable-disconnecting manipulation, can be detected based on the change in the impedance. After the cable-disconnecting manipulation, the waiting state for detecting the cable-connecting manipulation on the cable again can be assumed.

The charging station 2 operates by performing control processing shown in FIG. 4. At step 181, it is assumed that the power source 4 is set to the operating state (ON) and the cable-connecting manipulation is performed on the cable 7 by an operator. At step 182, it is checked whether the communication through the power line 6 is established. If the communication is not established yet, the processing is finished. If the communication is established, step 183 is executed. At step 183, predetermined communication with the in-vehicle system 3 is performed. At step 184, it is checked whether charging of the in-vehicle system 3 is permitted. The processing of step 184 may be performed by certifying that the in-vehicle system 3 is an authorized device that is permitted to be charged by the charging station 2. If charging is not permitted, this processing is finished. If charging is permitted, step 185 is executed.

At step 185, charging is performed by turning on the breaker switch 10 to supply charging power from the charging station 2 to the in-vehicle system 3. Further, predetermined charging control is performed to charge the battery 51 in the in-vehicle system 3 properly. At step 186, it is checked whether the charging was finished. Steps 185 and 186 are repeated until the charging is finished. When the charging is finished, step 187 is executed. At step 187, the charging is stopped by turning off the breaker switch 10. At step 188, the power source 4 is set to the stopped state (OFF) and the cable-disconnecting manipulation is performed on the cable 7 by the operator.

Figure 5:
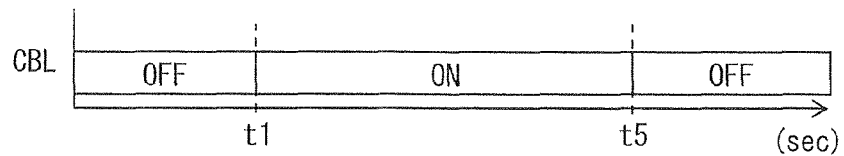
FIG. 5 is a time chart showing connection and disconnection of a cable in one use example in the first embodiment.
Figure 6:
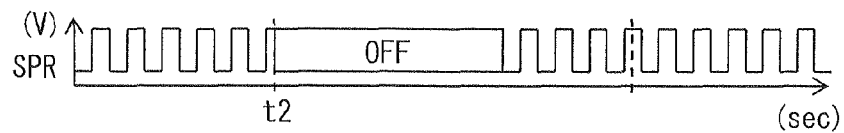
FIG. 6 is a time chart showing an inspection signal in the example of the first embodiment.
Figure 7:
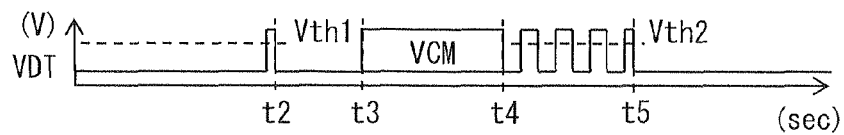
FIG. 7 is a time chart showing a detection signal in the example of the first embodiment.
Figure 8:
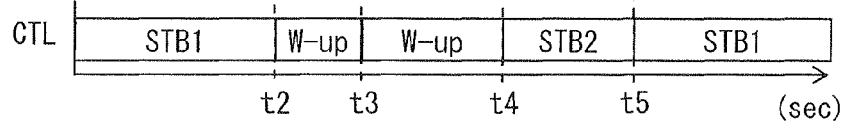
FIG. 8 is a time chart showing a power control mode performed by a control circuit in the example of the first embodiment.
Figure 9:
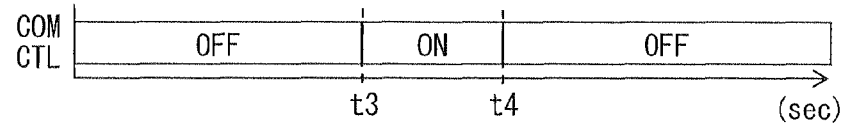
FIG. 9 is a time chart showing an operation mode of a communication control circuit in the example of the first embodiment.
Figure 10:
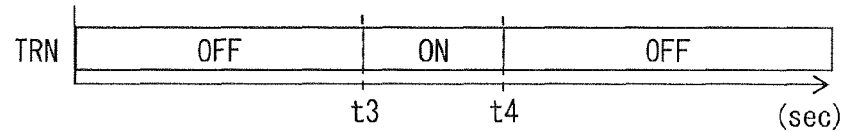
FIG. 10 is a time chart showing an operation mode of a transmitting circuit in the example of the first embodiment.
Figure 11:
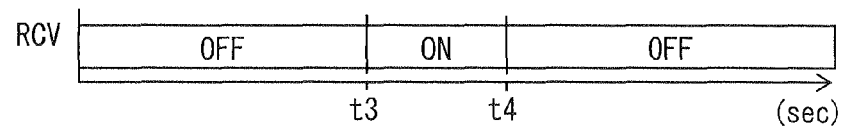
FIG. 11 is a time chart showing an operation mode of a receiving circuit in the example of the first embodiment.
Figure 12:
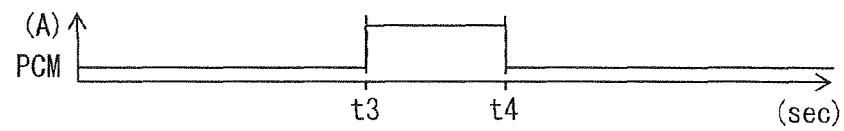
FIG. 12 is a time chart showing power consumption in the example of the first embodiment.

One example of operation of the first embodiment is shown as time charts shown in FIG. 5 to FIG. 12, with FIG. 5 showing the connection (ON) and the disconnection (OFF) of the cable (CBL), FIG. 6 showing the inspection signal SPR, FIG. 7 showing the detection signal VDT, FIG. 8 showing the power control mode performed by the control circuit (CTL) 39, FIG. 9 showing an operation mode of the communication control circuit (COM CTL), FIG. 10 showing an operation mode of the transmitting circuit (TRN), FIG. 11 showing an operation mode of the receiving circuit (RCV) and FIG. 12 showing power consumption PCM.

In this example, the cable 7 is assumed to be connected (ON) at time t1 and disconnected (OFF) at time t5. The pulse generating circuit 38a outputs the inspection signal SPR periodically until the connection of the cable 7 is detected. Until the connection of the cable 7 is detected, the transmitting circuit 35, the receiving circuit 36 and the communication control circuit 37 are in the waiting state (OFF). In this case, the control circuit 39 is in a first standby mode (STB1), which is for checking decrease in the impedance of the power line 6.

When the cable 7 is connected at time t1, the detection signal VDT increases in response to the inspection signal SPR. When the detection signal VDT exceeds the threshold value Vth1 at time t2, the control circuit 39 outputs the activation signal to the communication device 32 and the battery monitoring circuit 53. The activation signal is referred to a wakeup signal (W-up) in FIG. 8. The communication device 32 becomes operative (ON) after a delay time required for activation. Here, the transmitting circuit 35, the receiving circuit 36 and the communication control circuit 37 become operative (ON) at time t3. The communication device 32 performs the communication processing through the power line 6 in a period from time t3 to time t4. In this period, a voltage VCM corresponding to the communication signal appears in the detection signal VDT. In the period from time t3 to time t4, the control circuit 39 maintains the communication device 32 and the battery monitoring circuit 53 in the operative state. When the communication processing is finished at time t4, the transmitting circuit 35, the receiving circuit 36 and the communication control circuit 37 become inoperative (OFF). The inspection signal SPR is not output from time t2 to time t4.

After time t4, the pulse generating circuit 38a outputs the inspection signal SPR again. In this case, the control circuit 39 is in a second standby mode (STB2) for checking increase in the impedance of the power line 6. When the cable 7 is disconnected at time t5, the detection signal VDT decreases. When the detection signal VDT falls below a threshold value Vth2 at time t5, the control circuit 39 returns to the first standby mode again. The threshold value Vth2 is less than the threshold value Vth1. The threshold value Vth1 and the threshold value Vth2 may be the same value. Thus, the power consumption of the in-vehicle system 3 increases only during the period from time t3 to time t4 required to perform the communication processing by the communication device 32.

According to the first embodiment, the impedance of the power line 6 is detected by the detecting circuit 38 provided in the power line communication apparatus. The communication device 32 can be switched from a communication-disabled state to a communication-enabled state by switching over the communication device 32 from the waiting state (OFF) to the operating state (ON) based on the detected impedance. As a result, the power consumption of the communication device 32 can be lowered. Power consumption of the communication device 32 can be switched without a switch, which detects connection of a coupler. Further, power consumption of the communication device 32 can be switched without an exclusive signal line. Further, power consumption for performing the power line communication in the in-vehicle system 3, which is the load device, can be reduced.

Second Embodiment

Figure 13:
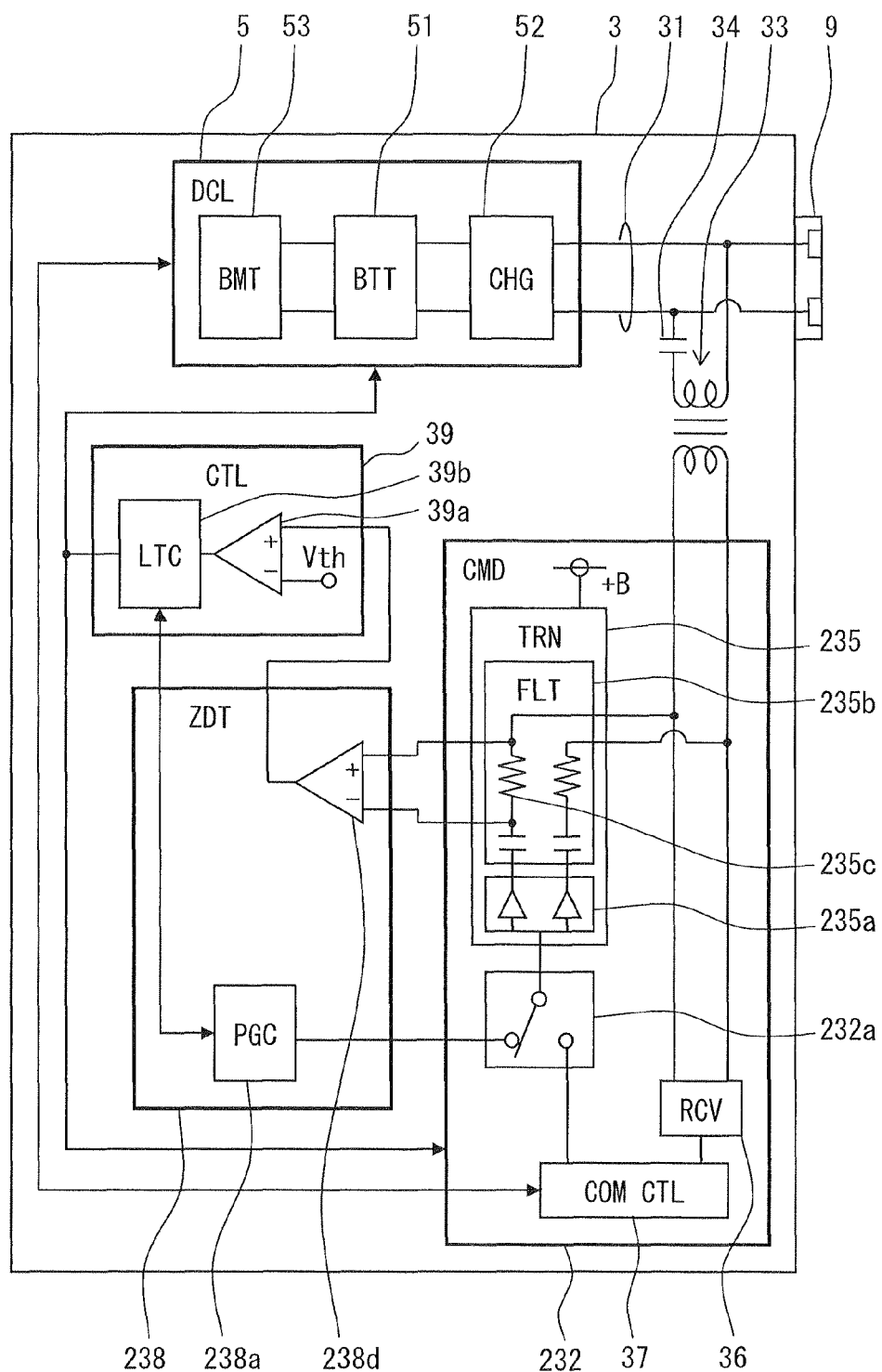
FIG. 13 is a block diagram showing an in-vehicle system according to a second embodiment, in which the present invention is implemented.

In the first embodiment, the impedance of the power line 6 is detected by the detecting circuit 38 in the period, in which the entirety of the communication device 32 is maintained in the waiting state (OFF). According to a second embodiment shown in FIG. 13, only a part of circuits in a communication device 232 is maintained in the waiting state and the impedance of the power line 6 is detected by other part of circuits in the communication device 232.

The communication device 232 includes a transmitting circuit 235, which transmits a communication signal to the power line 6, the receiving circuit 36, which receives the communication signal from the power line 6, and the communication control circuit 37, which controls the transmitting circuit 235 and the receiving circuit 36. The transmitting circuit 235 includes an amplifier 235a for transmission and a filter circuit 235b. The filter circuit 235b is a RC filter circuit, which includes a resistor 235c. The resistor 235c is arranged in series with a current supply path from the transmitting circuit 235 to the insulating transformer 33. The resistor 235c therefore develops a voltage drop corresponding to the current outputted from the transmitting circuit 235. The transmitting circuit 235 is supplied with power from a power source +B, which is independent of the receiving circuit 36 and the communication control circuit 37. As a result, even when power supply to the receiving circuit 36 and the communication control circuit 37 is interrupted, the transmitting circuit 235 is operative.

The detecting circuit 238 includes a pulse generating circuit (PGC) 238a, which supplies an inspection signal to the power line 6 through the transmitting circuit 235. The detecting circuit 238 further includes a differential amplifier 238d for amplifying a voltage drop of the resistor 235c, which forms a part of the communication device 232. The communication device 232 includes an input switching circuit 232a, which inputs the inspection signal supplied from the pulse generating circuit 238a to the transmitting circuit 235. The input switching circuit 232a inputs the communication signal to the transmitting circuit 235 when the communication control circuit 37 is in the normal operating state. The input switching circuit 232a inputs the inspection signal supplied from the pulse generating circuit 238a to the transmitting circuit 235 when the communication control circuit 37 is in the waiting state.

The inspection signal is amplified by the amplifier 235a of the transmitting circuit 235 and applied to the transmitting circuit 235 through the power line 6. According to the second embodiment, the inspection signal is supplied to the power line 6 through the transmitting circuit 235. As a result, it is possible to detect the impedance of the power line 6 by supplying the inspection signal to the power line 6 by using at lease a part of the transmitting circuit 235.

The detecting circuit 238 detects output current, which flows in accordance with the inspection signal supplied from the pulse generating circuit 238a, as the voltage drop of the filter circuit 235b. It is thus possible to detect the output current by using the filter circuit provided in the transmitting circuit.

Third Embodiment

Figure 14:
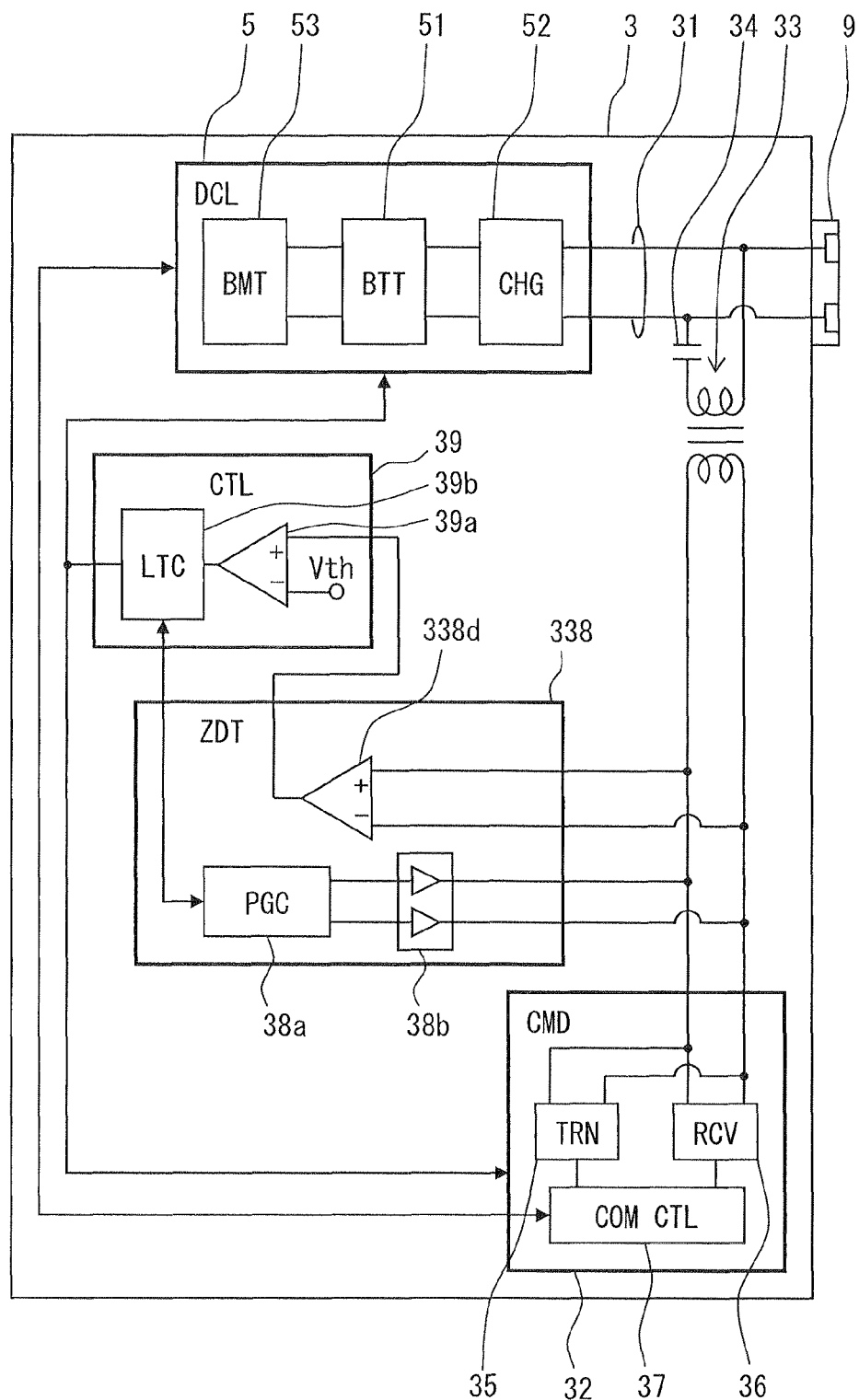
FIG. 14 is a block diagram showing an in-vehicle system according to a third embodiment, in which the present invention is implemented.

According to a third embodiment, as shown in FIG. 14, a detecting circuit 338 includes a differential amplifier 338d, which differentially amplifies a voltage produced across the primary coil of the insulating transformer 33. Thus, the output current, which flows in accordance with the inspection signal supplied from the pulse generating circuit 38a, is detected as a voltage drop of the insulating transformer 33. It is possible to detect the output current by using the insulating transformer 33.

Fourth Embodiment

Figure 15:
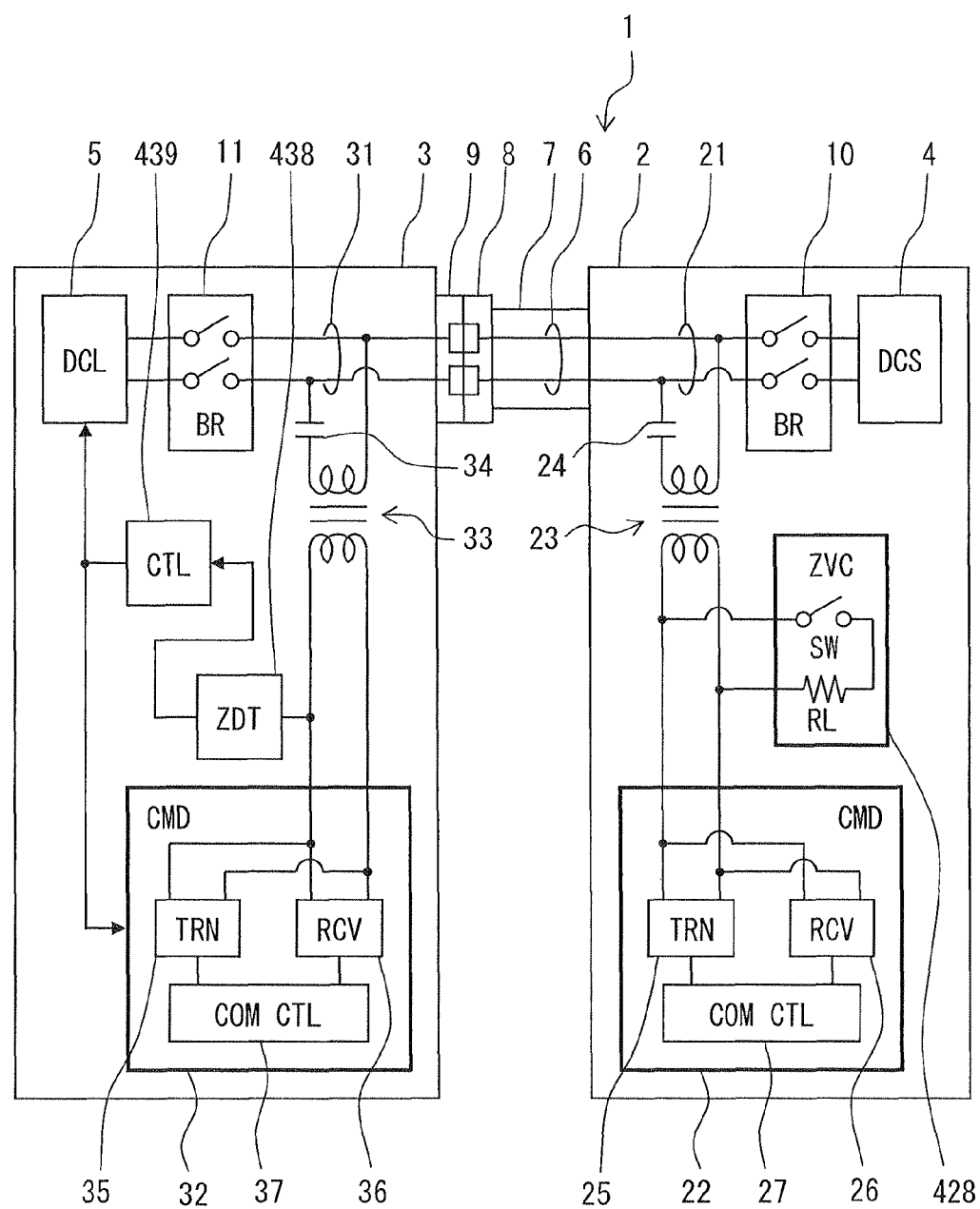
FIG. 15 is a block diagram showing an in-vehicle system according to a fourth embodiment, in which the present invention is implemented.

In the above-described embodiments, an impedance change of the power line 6 is detected as the cable-connecting manipulation of the cable 7. According to a fourth embodiment, as shown in FIG. 15, a request signal is transmitted from the charging station 2 to the in-vehicle system 3 as impedance change in the power line 6. This request signal may be alternative or in addition to the check signal in the first to the third embodiments.

The charging station 2 includes an impedance varying circuit (ZVC) connected in parallel to the primary coil of the insulating transformer 23. The impedance varying circuit 428 includes an impedance element RL and a switch SW. The impedance element RL varies an impedance at the primary side of the insulating transformer 23 when the switch SW is closed. This impedance change is detected at the in-vehicle system 3 side as the impedance change in the power line 6. A difference between the impedances of the power line 6 when the switch SW is in the turned-off state and in the turned-on state appears in the output of a detecting circuit 438. A control circuit 439 switches over the communication device 32 from the waiting state to the operating state, when the impedance detected by the detecting circuit 438 indicates a request from the charging station 2. The control circuit 439 may switches over the communication device 32 from the operating state to the waiting state when the impedance detected by the detecting circuit 438 indicates a request from the charging station 2. It is thus possible to manipulate the control circuit 439 from the charging station 2, which is a communication counterpart of the in-vehicle system 3.

Fifth Embodiment

Figure 16:
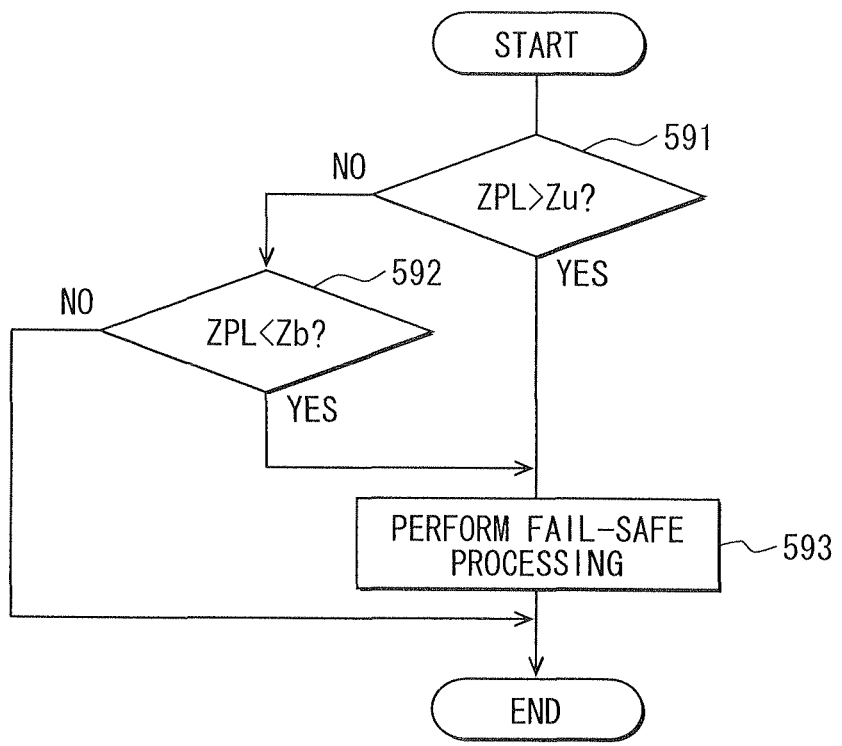
FIG. 16 is a block diagram showing an operation of an in-vehicle system according to a fifth embodiment, in which the present invention is implemented.

In a fifth embodiment, as shown in FIG. 16, fail-safe processing is executed. This processing is executed in addition to the above-described embodiments. Steps 591 and 592 form a failure detecting section, which checks whether the impedance detected by the detecting circuit 38 corresponds to a value indicating failure. Here, failure related to the power line is detected in accordance with the impedance of the power line 6. At step 591, it is checked whether the impedance ZPL is greater than an upper limit value Zu. At step 592, it is checked whether the impedance ZPL is less than a lower limit value Zb. Thus, it is checked whether the impedance ZPL is outside a normal range defined by the limit values Zu and Zb. If the impedance ZPL is outside the normal range, step 593 is executed. At step 593, fail-safe processing is performed in correspondence to a failure. For example, the in-vehicle system 3 turns off the breaker switch 11. Further, the in-vehicle system 3 may transmit a signal for turning off the breaker switch 10 to the charging station 2. It is thus possible to determine that the power line 6, which is a communication line, is in the failure state such as shorting. In addition it is possible to realize the fail-safe processing in correspondence to the failure.

Sixth Embodiment

Figure 17:
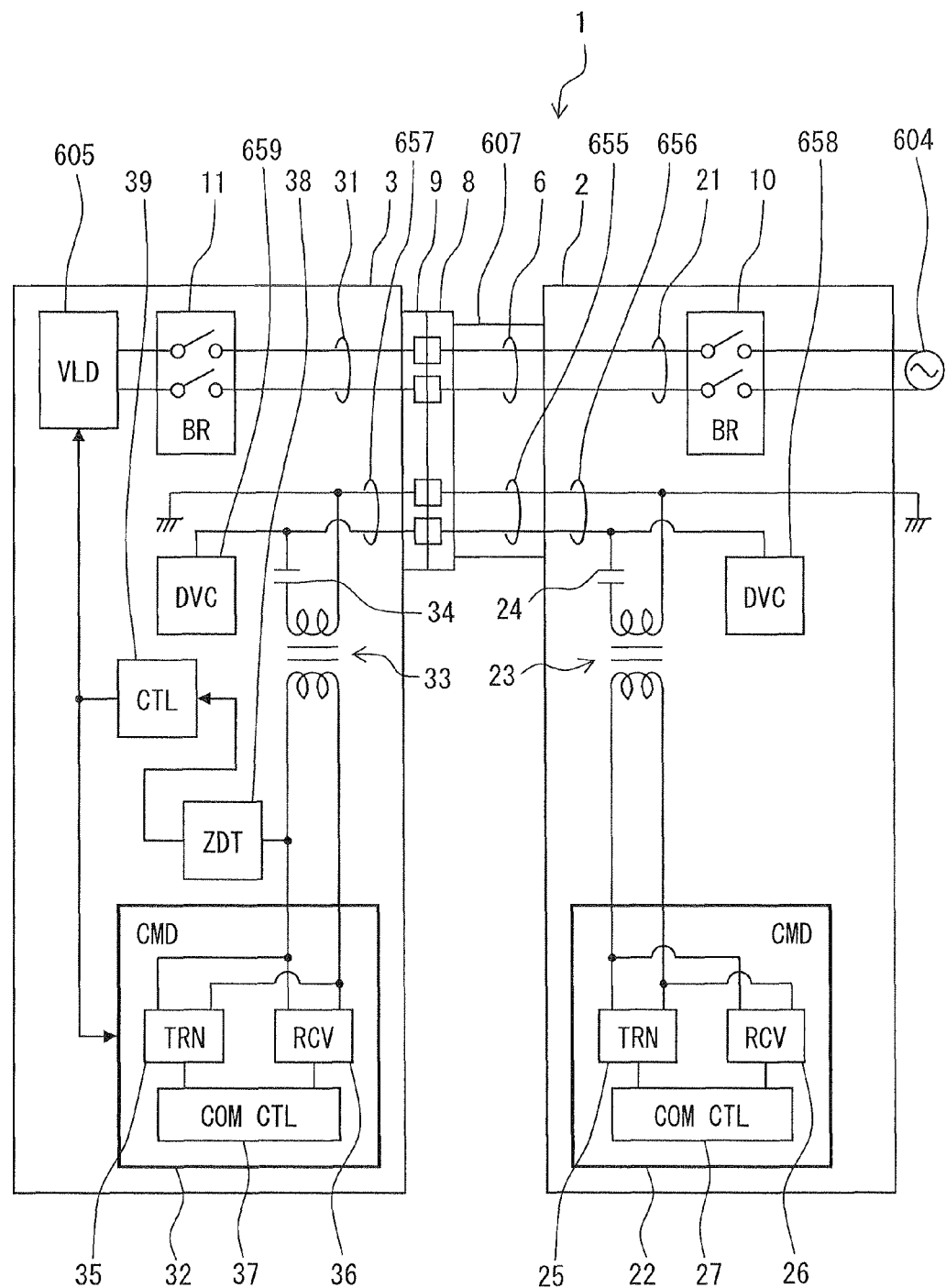
FIG. 17 is a block diagram showing a charging system according to a sixth embodiment, in which the present invention is implemented.

In the first to the fifth embodiments, the cable-connecting manipulation on the cable 7 is detected based on the impedance change of the power line 6 provided within the cable 7. According to a sixth embodiment, as shown in FIG. 17, a cable-connecting manipulation on a cable 607 is detected based on an impedance change of a signal line 655, which is also an electric line other than the power line 6 among plural lines provided in the cable 607. This cable manipulation detection may be alternative or in addition to the detection performed in the first to the fifth embodiments. According to the sixth embodiment, the cable-connecting manipulation on the cable 607 is detected based on the impedance change of the signal line 655, which is provided in the cable 607 for transmitting signals.

In the sixth embodiment, the charging station 2 includes an AC power source 604. The AC power source 604 may be a wide area power network or a small-sized power generation facility. AC power is supplied to the power line 6. The in-vehicle system 3 includes an in-vehicle load (VLD) 605. The in-vehicle load 605 is an AC load or a DC load, which includes a rectifying circuit.

The cable 607 connecting the charging station 2 and the in-vehicle system 3 includes plural lines including the power line 6. In the cable 607, another pair of electric wires forming the signal line 655 is provided in addition to a pair of electric wires forming the power line 6. The signal line 655 is arranged in parallel to the power line 6. The signal line 655 includes a first part 656 as a fixed part, which belongs to the charging station 2. The signal line 655 includes a second part 657 as a movable part, which belongs to the in-vehicle system 3.

The signal line 655 transmits and receives information by transmitting an analog signal and varying a DC voltage level. The signal line 655 also transmits and receives information by transmitting a pulse-width modulation signal and varying a duty ratio of the pulse-width modulation signal. The signal line 655 enables transmission and reception of information, which is represented by a high level voltage value and the duty ratio of the pulse-width modulation signal, by transmitting the pulse-width modulation signal. As one example of such a signal format, a control pilot signal CPTL is known. The signal line 655 is provided for transmission of a signal of a relatively low frequency.

The charging station 2 includes a control device (DVC) 658 provided therein. The in-vehicle system 3 includes a control device (DVC) 659 provided therein. The control device 658 and the control device 659 transmit and receive signals through the signal line 655. For example, the control device 658 transmits a rated current of the power line 6 to the control device 659 by the duty ratio of the control pilot signal CPLT. The control device 659 controls power supply to the in-vehicle load 60 in accordance with the rated current of the power line 60. The control device 659 remotely controls the control device 658 by varying the voltage level of the control pilot signal CPLT. For example, a relay or the like in the control device 658 of the charging station 2 is controlled by the control device 659 of the in-vehicle system 3. For example, the control device 659 of the in-vehicle system 3 manipulates the breaker switch 10 by varying the voltage level of the control pilot signal CPLT. The signal line 655 is housed in the cable 607 to transmit signals between the control device 658 and the control device 659. The control device 658 and the control device 659 control the charging station 2 or the in-vehicle system 3 by transmitting and receiving signals through the signal lines 655. More specifically, the control device 658 and the control device 659 control charging from the charging station 2 to the in-vehicle system 3 by transmitting and receiving signals through the signal lines 655.

According to the sixth embodiment, the communication device 22 and the communication device 32 are connected to the signal line 655, which is for transmitting the control pilot signal CPLT. The insulating transformer 23 and the coupling capacitor 24 are provided as the filter circuit between the communication device 22 and the signal line 655. The insulating transformer 33 and the coupling capacitor 34 are provided as the filter circuit between the communication device 32 and the signal line 655. The signal transmitted between the communication device 22 and the circuit 23 is a signal, which can be clearly distinguished from the control pilot signal CPLT. The signal transmitted and received between the communication device 22 and the circuit 23 has a frequency, which is far higher than that of the control pilot signal CPLT.

In the sixth embodiment as well, the power supply control device includes the detecting circuit 38 and the control circuit 39. The detecting circuit 38 detects the impedance of the signal line 655. The control circuit 39 switches over its state between the waiting state and the operating state based on the impedance detected by the detecting circuit 38. The control circuit 39 switches over the communication device 32 from the waiting state to the operating state when the impedance detected by the detecting circuit 38 indicates the cable-connecting manipulation on the cable 607.

The control circuit 39 switches over the in-vehicle load 605 between the waiting state and the operating state based on the impedance detected by the detecting circuit 38. The control circuit 39 switches over the in-vehicle load 605 from the waiting state to the operating state when the impedance detected by the detecting circuit 38 indicates the cable-connecting manipulation on the cable 607. It is thus possible to switch over the electric device, which includes the in-vehicle load 605 and the communication device 32, from the waiting state to the operating state when the cable 607 is connected.

According to the sixth embodiment, the impedance of the signal line 655, which transmits and receives the analog signal, is detected by the detecting circuit 38. By switching the communication device 32 from the waiting state to the operating state based on the detected impedance, it is possible to switch over the communication device 32 from the communication-disabled state to the communication-enabled state. It is thus possible to reduce power consumption of the communication device 32. It is also possible to switch over the power consumption of the communication device 32 without providing a switch for detecting connection of the coupler. It is further possible to switch over power consumption of the communication device 32 without providing a specifically-dedicated signal line. It is thus possible to reduce the power consumption of the in-vehicle system 3, which is the load device.

Seventh Embodiment

Figure 18:
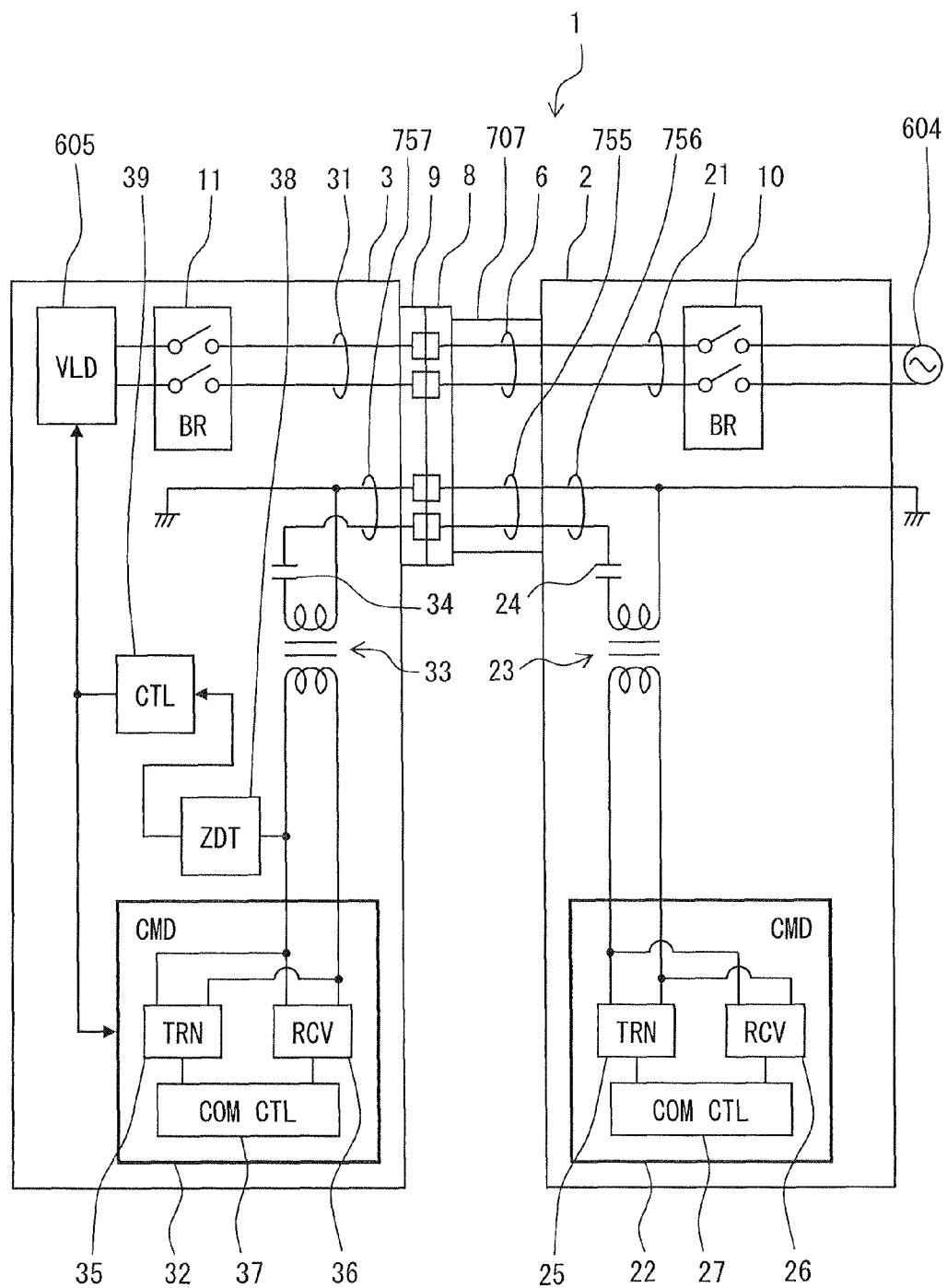
FIG. 18 is a block diagram showing a charging system according to a seventh embodiment, in which the present invention is implemented.

In the sixth embodiment, the cable-connecting manipulation on the cable 607 is detected based on the impedance change of the signal line 656, which transmits signals between the control devices 658 and 659. Alternatively or in addition, according to a seventh embodiment shown in FIG. 18, the cable-connecting manipulation on a cable 707 is detected based on an impedance change of a dedicated signal line 755 provided as an electric line as well between the communication devices 22 and 32.

The cable 707 connecting the charging station 2 and the in-vehicle system 3 includes the signal line 755. The signal line 755 is arranged in parallel to the power line 6. The signal line 755 includes a first part 756 as a fixed part, which belongs to the charging station 2. The signal line 755 includes a second part 757 as a movable part, which belongs to the in-vehicle system 3. The signal line 755 is specifically dedicated to transmit and receive signals between the communication device 22 and the communication device 32.

According to the seventh embodiment, the communication device 22 and the communication device 32 are connected to the signal line 755. The insulating transformer 23 and the coupling capacitor 24 are provided as the filter circuit between the communication device 22 and the signal line 755. The insulating transformer 33 and the coupling capacitor 34 are provided as the filter circuit between the communication device 32 and the signal line 755.

In the seventh embodiment as well, the power supply control device includes the detecting circuit 38 and the control circuit 39. The detecting circuit 38 detects the impedance of the signal line 755. The control circuit 39 switches over the control circuit 39 between the waiting state and the operating state based on the impedance detected by the detecting circuit 38. The control circuit 39 switches over the communication device 32 from the waiting state to the operating state when the impedance detected by the detecting circuit 38 indicates the cable-connecting manipulation on the cable 707.

The control circuit 39 switches over the in-vehicle load 605 between the waiting state and the operating state based on the impedance detected by the detecting circuit 38. The control circuit 39 switches over the in-vehicle load 605 from the waiting state to the operating state when the impedance detected by the detecting circuit 38 indicates the cable-connecting manipulation on the cable 707. It is thus possible to switch over the electric device, which includes the in-vehicle system 605 and the communication device 32, from the waiting state to the operating state when the cable 707 is connected.

According to the seventh embodiment, the impedance of the signal line 755 is detected by the detecting circuit 38. By switching the communication device 32 from the waiting state to the operating state based on the detected impedance, it is possible to switch over the communication device 32 from the communication-disabled state to the communication-enabled state. It is thus possible to reduce power consumption of the communication device 32. It is also possible to switch over the power consumption of the communication device 32 without providing a switch for detecting connection of the coupler. It is possible to reduce the power consumption of the in-vehicle system 3, which is the load device.

Other Embodiments

The present invention described above with reference to its preferred embodiments is not limited to such embodiments but may be implemented in other modified embodiments.

For example, in the above-described embodiments, the connecting member is provided by the cable 7 and the couplers 8, 9, which are manually manipulatable. Alternatively it is possible to use a contact mechanism, which electrically connects the first part 21 and the second part 31 of the power line 6 when a vehicle is stopped at a predetermined position.

In the above-described embodiments, the communication device 32 is switched over from the waiting state to the operating state based on the impedance of the power line 6. In addition, the communication device 32 may be switched over from the operating state to the waiting state based on the impedance of the power line 6. It is thus possible to switch over the communication device 32 from the operating state to the waiting state automatically in response to the impedance change of the power line 6. It is also possible to perform the switching-over of the communication device 32 from the waiting state to the operating state in response to the cable-connecting manipulation on the power line 6 and perform the switching-over of the communication device 32 from the operating state to the waiting state in response to a request from the charging station 2.

Although the impedance of the power line 6 is detected in the in-vehicle system 3, it is also possible to detect the impedance of the power line 6 in the charging station 2 and switch over the power supply control mode of the device including the communication device 32. It is also possible to perform the fail-safe processing in the charging station 2.

The section and function provided by the control circuit and the control device in the above-described embodiments may be provided by only software, only hardware or a combination of these. For example, the control circuits may be formed by an analog circuit.

In the above-described embodiments, the line, the impedance of which is detected by the detecting circuit 38, and the line, through which the communication devices 22 and 32 communicate, are the same. Alternatively, a line, the impedance of which is detected by the detecting circuit 38, and a line, through which the communication devices 22 and 32 communicate, may be different. For example, the detecting circuit 38 may detect the impedance change of the power line 6 and the communication devices 22, 32 may communicate through the line, which is exclusive to communication.

The configurations according to the second embodiment to the fifth embodiment may be used in the sixth embodiment and the seventh embodiment as well.

In the first embodiment to the fifth embodiment, the power line 6 transmits the DC power. Alternatively, as described in the sixth embodiment and the seventh embodiment, it is possible to provide the AC power supply source in the charging station 2 so that the power line 6 may transmit the AC power. It is also possible to provide an AC load in the in-vehicle system 3 so that the power line 6 transmits the AC power.

In the above-described embodiments, the communication control circuit 37 is provided with the certification function. It is possible alternatively to provide a certification control circuit, which performs the certification processing, separately from the communication control circuit 37.

What is claimed is:

1. A communication apparatus for providing communication between a power supply device to a load device through an electric line, which is provided detachably between the power supply device and the load device, the electric line including a power line, which supplies power from the power supply device to the load device, the communication apparatus comprising:
   a communication device for transmitting and receiving a communication signal through the electric line;
   a detecting circuit for detecting impedance of the electric line; and
   a control circuit for switching over the communication device between a waiting state and an operating state based on the impedance detected by the detecting circuit,
   wherein the load device includes a secondary battery, which is charged by the power supply device through the electric line,
   the communication device, the detecting circuit and the control circuit are provided in the load device, and
   the detecting circuit includes an output circuit for outputting an inspection signal to the line and detecting the impedance of the electric line in response to the inspection signal.

2. The communication apparatus according to claim 1, wherein:
   the secondary battery is mounted in a vehicle; and
   the power supply device is a charging device for charging the secondary battery.

3. The communication apparatus according to claim 1, wherein:
   the control circuit switches over the communication device from the waiting state to the operating state when the impedance detected by the detecting circuit indicates a cable-connecting manipulation on the electric line.

4. The communication apparatus according to claim 3, wherein:
   the control circuit includes a first checking section, an activation section, a second checking section and a returning section;
   the first checking section is configured to check whether an impedance change detected by the detecting circuit indicates a change from disconnection to connection of the electric line;
   the activation section is configured to switch over the communication device from the waiting state to the operating state in response to a check result of the first check section;
   the second checking section is configured to check whether the impedance change detected by the detecting circuit indicates a change from the connection to the disconnection of the electric line; and
   the returning section is configured to return to a check operation of the first checking section in response to a check result of the second checking section.

5. The communication apparatus according to claim 1, wherein:
   the control circuit switches over the communication device from the waiting state to the operating state when the impedance detected by the detecting circuit indicates a request from a communication counterpart.

6. The communication apparatus according to claim 5, wherein:
   the communication counterpart includes an impedance varying circuit for varying the impedance of the electric line to indicate the request.

7. The communication apparatus according to claim 1, wherein:
   the communication device includes a transmitting circuit for transmitting the communication signal to the electric line, a receiving circuit for receiving the communication signal from the electric line, and a communication control circuit for controlling the transmitting circuit and the receiving circuit.

8. The communication apparatus according to claim 1, wherein:
   the communication device includes a transmitting circuit for transmitting the communication signal to the electric line, a receiving circuit for receiving the communication signal from the electric line, and a communication control circuit for controlling the transmitting circuit and the receiving circuit; and
   the detecting circuit includes an output circuit for outputting an inspection signal to the electric line through the transmitting circuit and detects the impedance of the electric line based on the inspection signal.

9. The communication apparatus according to claim 8, wherein:
   the detecting circuit detects the impedance based on output current of the output circuit detected when the inspection signal is outputted.

10. The communication apparatus according to claim 9, wherein:
    the detecting circuit detects the output current of the output circuit based on a voltage drop of a filter circuit.

11. The communication apparatus according to claim 9, wherein:
    the detecting circuit detects the output current of the output circuit based on a voltage drop of a transformer.

12. The communication apparatus according to claim 1, wherein:
the detecting circuit detects the impedance of the electric line periodically.

13. The communication apparatus according to claim 1, wherein:
the control circuit includes a failure detecting section for detecting whether the impedance detected by the detecting circuit indicates a value, which corresponds to a failure.

14. The communication apparatus according to claim 1, wherein:
the communication device is configured to transmit and receive the communication signal relative to the power line; and
the detecting circuit is configured to detect the impedance of the power line.

15. The communication apparatus according to claim 1, wherein:
the electric line includes, in addition to the power line, a signal line for transmitting a signal;
the communication device is configured to transmit and receive the communication signal relative to the signal line; and
the detecting circuit is configured to detect the impedance of the signal line.

16. The communication apparatus according to claim 15, wherein:
the signal line is configured to transmit a signal between a control device provided in the power supply device and a control device provided in the load device.

17. The communication apparatus according to claim 16, wherein:
the control device provided in the power supply device and the control device provided in the load device are configured to transmit and receive information by varying a DC voltage level transmitted through the signal line.

18. The communication apparatus according to claim 17, wherein:
the control device provided in the power supply device and the control device provided in the load device are configured to transmit and receive information by varying a duty ratio of a pulse-width modulation signal transmitted through the signal line.

* * * * *